United States Patent [19]

Kaiserswerth et al.

[11] Patent Number: 5,684,954
[45] Date of Patent: Nov. 4, 1997

[54] METHOD AND APPARATUS FOR PROVIDING CONNECTION IDENTIFIER BY CONCATENATING CAM'S ADDRESSES AT WHICH CONTAINING MATCHED PROTOCOL INFORMATION EXTRACTED FROM MULTIPLE PROTOCOL HEADER

[75] Inventors: Matthias Kaiserswerth, Richterswil; Erich Ruetsche, Pfaeffikon, both of Switzerland

[73] Assignee: International Business Machine Corp., Armonk, N.Y.

[21] Appl. No.: 501,119
[22] PCT Filed: Mar. 20, 1993
[86] PCT No.: PCT/EP93/00677
  § 371 Date: Aug. 9, 1995
  § 102(e) Date: Aug. 9, 1995
[87] PCT Pub. No.: WO94/22253
  PCT Pub. Date: Sep. 29, 1994
[51] Int. Cl.$^6$ ................ H04J 3/00; H04J 3/24; H04L 12/46
[52] U.S. Cl. ................ 395/200.2; 395/200.21; 395/200.17; 370/393
[58] Field of Search .......... 395/200.15, 200.16, 395/200.17, 200.18, 200.2, 200.21; 370/393, 392

[56] References Cited

U.S. PATENT DOCUMENTS 5,390,173  2/1995  Spinney et al. .............. 370/393
5,448,565  9/1995  Chang et al. ................ 370/402
5,481,540  1/1996  Huang ......................... 370/401
5,513,134  4/1996  Cooperman et al. ......... 365/49
5,515,513  5/1996  Metzger et al. ............. 395/200.15
5,566,170  10/1996 Bakke et al. ................. 370/392

OTHER PUBLICATIONS

Pei et al. "Putting Routing Tables in Silicon", IEEE Network Magazine, Jan. 1992, pp. 42–50 1992.

Oechslin et al. "Ali: A Versitile Interface Chip for ATM Systems", Globecom '92, pp. 1282–1287 1992.

Primary Examiner—Thomas C. Lee
Assistant Examiner—D. Dinh
Attorney, Agent, or Firm—Jeanine S. Ray-Yarletts

[57] ABSTRACT

The present application concerns a method and an apparatus, in a communication network, for processing the various fields of a protocol header preceding a data stream to provide a unique connection identifier for processing the data stream. All relevant protocol information is extracted from the protocol header for look up in a Content-Addressable Memory (CAM) (80). Each time an entry in the CAM (80) matches protocol information applied to the CAM's input (84), the CAM address of this storage section, i.e. the address of a row of the CAM (80), is provided at the output (82) thereof. The CAM addresses obtained from the protocol header are concatenated by means of a Connection Number Builder (CNB, 95) resulting in a unique connection identifier provided at the Protocol Filter's output (96) to be used for the processing of the data stream.

13 Claims, 6 Drawing Sheets

METHOD AND APPARATUS FOR PROVIDING CONNECTION IDENTIFIER BY CONCATENATING CAM'S ADDRESSES AT WHICH CONTAINING MATCHED PROTOCOL INFORMATION EXTRACTED FROM MULTIPLE PROTOCOL HEADER

TECHNICAL FIELD

The present invention concerns a method and an apparatus for scanning data streams in a communication network and extracting connection information to provide for unique protocol connection identifiers.

BACKGROUND OF THE INVENTION

The technological convergence of computer and communication networks, as well as the fast development in either one of these two areas, has led to such an intimate mixture of information processing and communication that the transmission and exchange of data, voice, images etc. becomes more and more complex. Each transmission or exchange of information—information used as synonym for various kinds of data, services, and communications—has necessarily to be governed by rules of procedure.

When different units, e.g. two remote computer terminals, or two procedures are interacting via an interface, which is not necessarily a hardware interface, respective protocols are employed. Depending on the network, various protocols are hierarchically ordered, resulting in a vertical stack of protocols, each of these protocols interacting with the adjacent ones. Basic transport protocols are known to organize the information exchange and transmission between remote systems, such as host computers. A typical example is the ARPA (Advanced Research Projects Agency) host-to-host protocol. Such a basic protocol enables the higher-level protocols of the vertical protocol stack to base all their operations on the basic protocol mechanisms.

Depending on the network environment, there are several higher-level protocols set up on the basic protocol. A schematic representation of a typical vertical protocol stack, known as OSI (Open Systems Interconnection) reference model for CCITT (Consultative Committee on International Telephone and Telegraph) applications is defined in the CCITT Recommendation X.200, "Reference Model of Open Systems Interconnection for CCITT Applications", Blue Book, Fascicle VIII.4, Geneva, 1989. Said OSI reference model uses seven levels, referred to as layers. Each layer has its own specific function and offers a defined service to the layer above using the services provided by the layer below.

If an application program, for example, which runs on a first system requires the use of data held in a second, remote system, an exchange of information takes place. When said second system receives a request to send a specific data packet, this data packet has to be transmitted from the highest protocol level, e.g. the application layer, down through all lower protocol levels, prior to be sent along the physical link. Each of these protocol layers adds its layer-specific connection information to the data packet received from the higher layer. Therefore, a communication connection between two systems is defined in a packet header, hereinafter referred to as protocol header, by the aggregate of fields carrying connection information of the vertical protocol stack.

When receiving a data stream made up of data packets at a receiver site, prior to routing, multiplexing or compressing it, said protocol header has to be scanned to extract the respective words comprising connection information for further processing To date, most of the protocol connections are identified by sequentially processing the protocol headers in software. This operation consumes a considerable amount of time in the protocol processing, in particular when dealing with many connections, e.g. in a server, or when processing multimedia data streams.

A microprogrammed controller, used to recognize the protocol type of a protocol header and to extract protocol specific data fields, has been described in "Implementing PE-1000 Based Internetworking Nodes", H. W. Chin et al., Part 3 of 3, Transfer, Vol. 5, No. 3, May/June 1992, pp. 5–8.

The hardware implementation of a routing table for the translation of packet identifiers into an appropriate physical output link is described in "Putting Routing Tables in Silicon", T.-B. Pei and C. Zukowski, IEEE Network Magazine, January 1992, pp. 42–50. This approach is mainly characterized in that a Content-Addressable Memory (CAM) is employed to match connection information in the header of a single protocol. In addition, the advantages and disadvantages of CAMs versus conventional Random-Access-Memories (RAM), used to store routing information, have been evaluated by Pei and Zukowski.

Neither of the two systems above, both of them relating to the solution of sub-problems, nor the known software approaches allow fast processing of multiple transport protocols such as TCP (Transmission Control Protocol)—"Transmission Control Protocol; DARPA Internet Program Protocol Specification", RFC 793, DARPA, September 1981—and XTP (Express Transport Protocol)—"XTP Protocol Definition", Protocol Engines Incorporated, Revision 3.6., edited by Protocol Engines, Mountain View, Calif., 11 Jan. 1992—which build on the Internet Protocol (IP)—"Internet Protocol; DARPA Internet Program Protocol Specification", RFC 791, DARPA (Defense Advanced Research Projects Agency), September 1981—or TP4 (Transport Protocol, Type 4)—"Connection Oriented Transport Protocol Specification", ISO/IEC JTC1 Draft International Standard ISO/IEC DIS 8073—which builds on CLNP (Connectionless Network Protocol)—"Protocol for Providing the Connectionless-Mode Network Service", ISO ISO/IEC 8473. The abbreviation RFC, as herein used, is an acronym of the term Request for Comments. In addition, the present invention is well suited for processing multimedia traffic as for example ST-II (Stream protocol, version 2)—"Experimental Internet Stream Protocol; Version 2 (ST-II)", RFC 1190, October 1990, edited by C. Topolcic. The processing of protocol headers and the recognition of different protocol types in real time is a very complicated and difficult undertaking. In almost all network systems, header processing is still a major CPU-cycle (Central Processor Unit) consuming activity. The claimed invention does not only extract protocol data fields, see H. W. Chin et al., but uses these fields to extract a unique connection identifier. This operation is performed in real-time. Additionally, the present method and apparatus are designed for processing protocol stacks.

It is an object of the present invention to provide a method for improved header processing in networks carrying traffic of various protocols.

It is a further object of the present invention to provide a method for fast and reliable processing of addressing, i.e. connection, information of multiprotocol data streams.

It is another object of the present invention to provide a method for fast and reliable processing of multiprotocol data streams comprising multimedia data.

It is an object of the present invention to provide a method which allows real-time processing of addressing, i.e. connection, information of complex protocol headers.

It is another object of the present invention to provide a hardware implementation of said methods.

SUMMARY OF THE INVENTION

The above objects have been accomplished by providing a method in accordance with claim 9 and a hardware implementation, referred to as Protocol Filter, of said method in accordance with claim 1. This method and apparatus are characterized in that the protocol-type information of a first protocol is extracted and the protocol information of protocols built on said first protocol are read, sequentially. The protocol-type information and said protocol information are applied to the input of a CAM to provide an address at the CAM's output each time the information applied to this input matches information stored in said CAM. The addresses provided at the output are concatenated to a unique connection identifier.

DESCRIPTION OF THE DRAWINGS

The invention is described in detail below with reference to the following drawings.

GENERAL DESCRIPTION

When exchanging or transmitting information, e.g. data packets or multimedia data streams, in or along a network, the transmission or exchange builds on multiple protocol types. The protocol information of the different protocol types is inserted into a protocol header of a data packet or data stream to be transmitted.

This protocol header has to be received and processed prior to routing the attached data stream through a switch or a network, prior to compressing incoming traffic, or prior to multiplexing it. The processing of headers, in particular the processing of the protocol related words therein, typically takes place in network nodes, adapters, bridges, multiplexers, compressors, protocol analyzers, switches and servers, just to name some of the conceivable environments.

Figure 1:
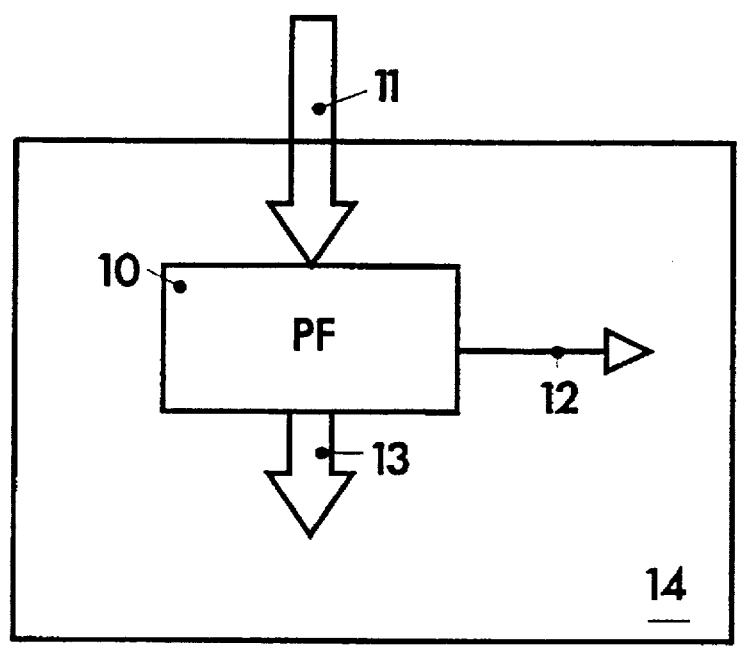
FIG. 1 shows a schematic block diagram of the Protocol Filter in accordance with the first embodiment of the present invention.
Figure 2:
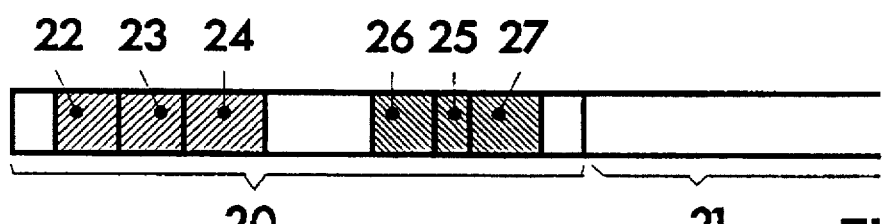
FIG. 2 shows a data stream preceded by a protocol header comprising header fields of two different protocols.

In connection with the first embodiment, the basic concept of the present invention will be described. The inventive Protocol Filter (PF) 10 is shown in FIG. 1. By means of the PF 10, processing of protocols is much simpler, since connection identification of layered protocol headers—in accordance with the inventive method—when being implemented in hardware, is much faster. The function of the Protocol Filter 10 is to extract the relevant information from the protocol header of a received data stream or packet, to compare this information with stored connection information and to provide the associated connection identifier if both data are equal. In the present embodiment, PF 10 is employed in a Token-Ring network adapter 14 to extract all relevant words from the fields 22–27 of a protocol header 20 preceding a data stream 21, received via bus 11, as schematically illustrated in FIG. 2. At an output port 12, a connection identifier is provided which can be used for further processing. This further processing depends on the environment in which the Protocol Filter 10 is used.

As schematically illustrated in FIG. 2, the data stream 21 is preceded by said protocol header 20. In this simplified Figure, the header 20 comprises fields 22, 23, and 24 which belong to a first protocol and fields 25 through 27 belonging to a second protocol which builds on said first protocol. In this Figure, fields comprising protocol information relevant for the processing of the respective data stream 21 are hatched.

Figure 3:
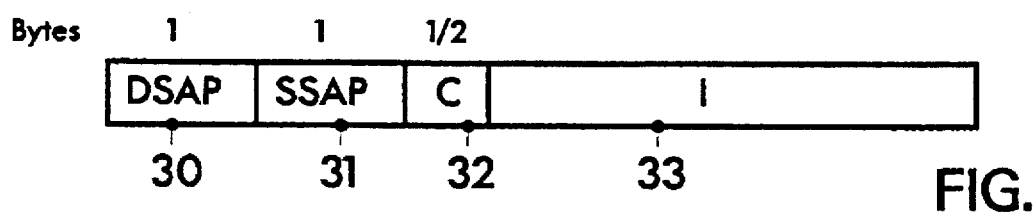
FIG. 3 shows a LLC (Logical Link Control) frame.

The Protocol Filter 10 of the first embodiment, as part of said Token-Ring adapter 14, is employed in a Token-Ring network carrying TCP/IP, ST-II, and ISO CLNP/TP4 traffic. Details of said network are described in "IBM Token-Ring Network: Architecture Reference", SC30-3374-02, third edition, September 1989. The Token-Ring adapter 14 handles the Medium Access Control (MAC) in its finite state machines. The LLC (Logical Link Control) frames, in LPDU (Link Protocol Data Unit) format, received by the adapter 14 and to be processed by the Protocol Filter 10, are shown in FIG. 3. The DSAP (Destination Service Access Point) field 30 identifies the access point for which said LPDU is intended. Typical values of the DSAP field 30 are given in the above mentioned "IBM Token-Ring Network: Architecture Reference", SC30-3374-02. The DSAP value, i.e. the protocol-type information, is used as starting point by the Protocol Filter 10 in the search through the different protocol addresses. These protocol addresses are arranged in trees, in accordance with the present invention. In the first embodiment, the TCP/IP and ST-II addresses are part of a first tree shown in FIG. 4, and the addresses corresponding to the CLNP/TP4 protocol are arranged in a second tree, which is illustrated in FIG. 5.

Figure 4:
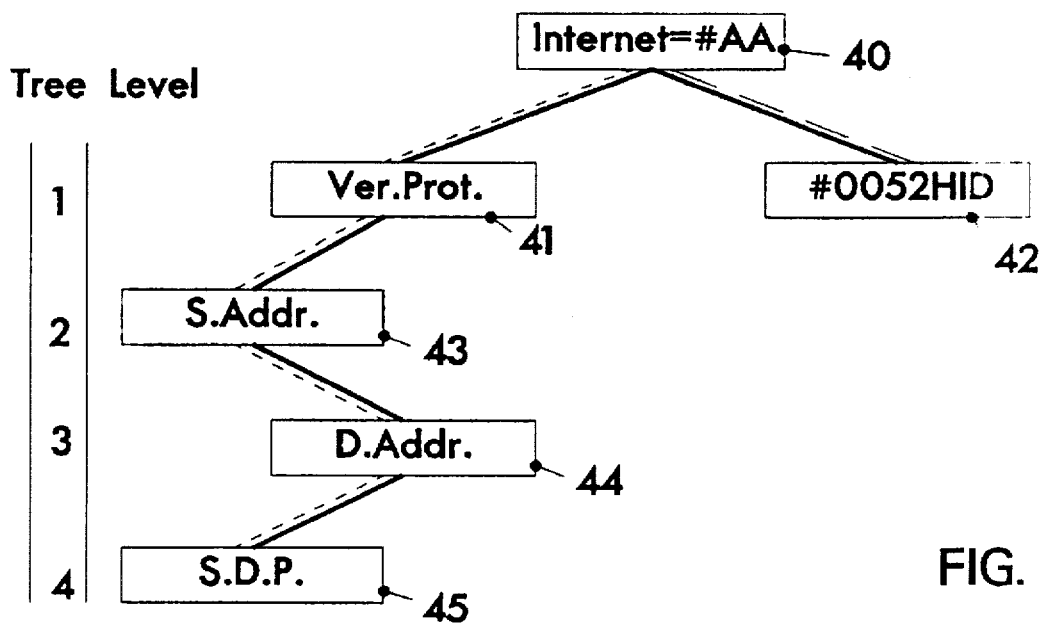
FIG. 4 shows the hierarchical structure of the TCP (Transmission Control Protocol) which builds on IP (Internet Protocol), and the ST-II protocol derived from the IP.
Figure 5:
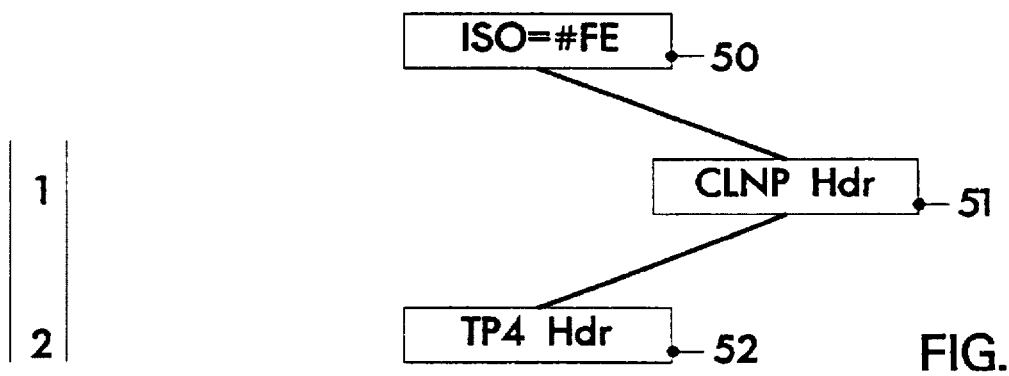
FIG. 5 shows the hierarchical structure of the TP4 (Transport Protocol, Type 4) which builds on CLNP (ConnectionLess Network Protocol).

The addresses and protocol specific information used in the various layers of the Internet Protocol (IP) form the tree shown in FIG. 4. The first protocol which builds on the Internet Protocol, i.e. the TCP/IP, is arranged on the left hand side of FIG. 4 and consists of four tree levels. A TCP/IP connection is defined by the path through said tree (short-dashed) starting at the root 40 of the tree characterizing the Protocol Type (=Internet) on which the TCP builds. The first level defines the protocol version (Ver. Prot.) 41, the second level the source address (S.Addr.) 43, followed by the destination address (D.Addr.) 44 and, at the fourth level, the source/destination port (S.D.P.) 45. This first path defining the TCP/IP connection is stored in a Content-Addressable Memory of the Protocol Filter 10, as will be described later. A second path (dashed) defines a ST-II connection. This second path starts at the root 40 of the same tree and ends at the first level at 42. This second connection is solely defined by the protocol type (=Internet) and the protocol version (=#0052HID) in the present example. This second path is stored in the PF 10, too. In the present application, the # sign is used in connection with hexadecimal notation.

Figure 6A:
FIG. 6A shows the fields of a TCP header which builds on an IP header.
Figure 6A:

FIG. 6A illustrates a TCP/IP header. The uppermost part of FIG. 6A shows the Internet Protocol header. The meaning of the abbreviations used in the IP header fields are listed in the below given Table 1. The abbreviations of the header fields 60–65 required for processing in the present Protocol Filter 10, i.e. carrying words comprising protocol information, are printed bold.

TABLE 1

| | Internet Protocol header | | |
|---|---|---|---|
| | | Bits | No. |
| Ver | (Protocol) Version | 4 | 60 |
| IHL | Internet Header Length | 4 | 61 |
| TOS | Type of Service | 8 | 62 |
| L | Total length | 16 | |
| ID | Identification | 16 | |
| F | Flags | 3 | |
| FO | Fragment Offset | 13 | |
| TTL | Time to Live | 8 | |
| PROTO | Protocol | 8 | 63 |
| HC | Header ChecKsum | 16 | |
| DA | Destination Address | 32 | 65 |
| SA | Source Address | 32 | 64 |

The TCP part of the protocol header is illustrated in FIG. 6A, too. The abbreviations used in the fields of this TCP header are listed in Table 2. The abbreviations of the relevant fields 66, 67 of the TCP header are printed bold.

TABLE 2

| | TCP header | | |
|---|---|---|---|
| | | Bits | No. |
| SP | Source Port | 16 | 66 |
| DP | Destination Port | 16 | 67 |
| SN | Sequence Number | 32 | |
| AN | Acknowledge Number | 32 | |
| DO | Data Offset | 4 | |
| RF | Reserved/Flags | 12 | |
| W | Window | 16 | |

Figure 8:
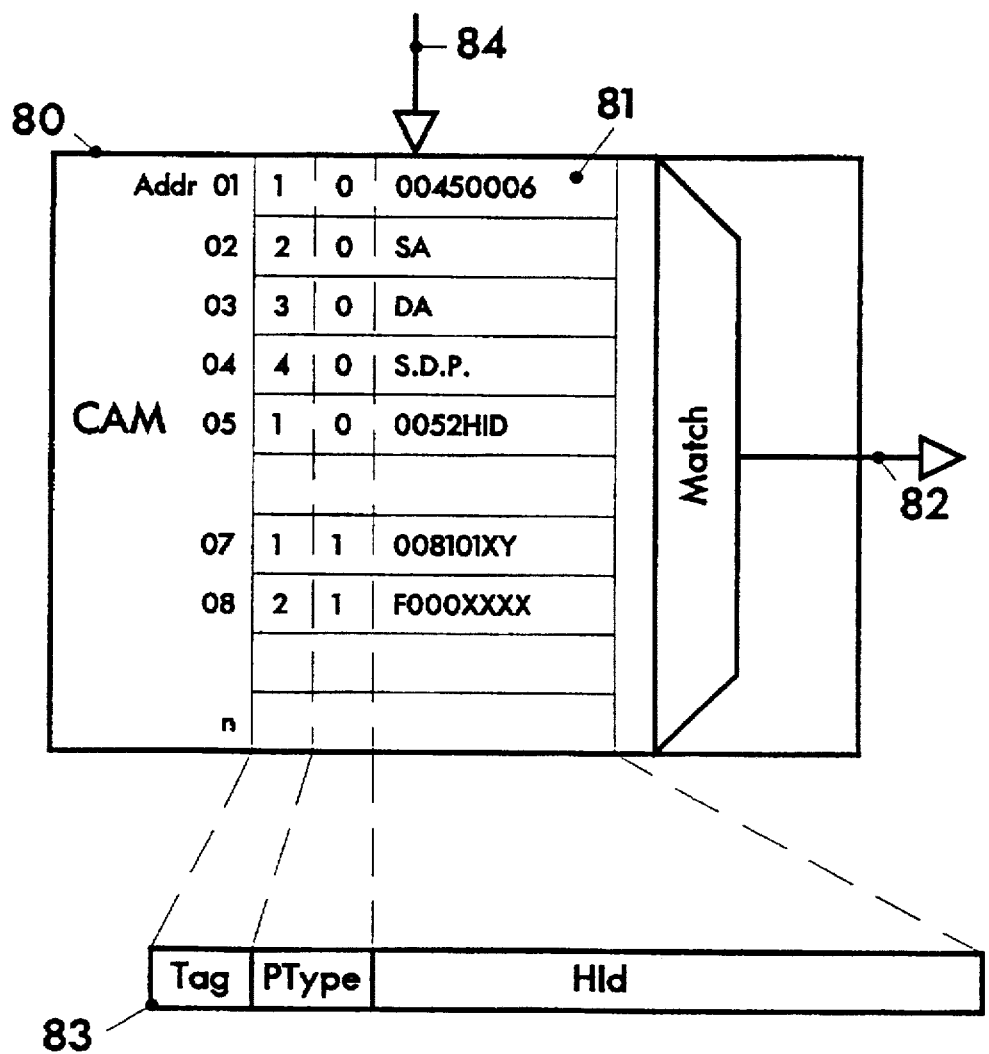
FIG. 8 shows a Content-Addressable Memory (CAM) as being employed in the Protocol Filter of the first embodiment.

The content of the header fields of the IP header is defined in "Experimental Internet Stream Protocol; Version 2 (ST-II)", RFC 1190, October 1990, edited by C. Topolcic (in particular on page 75 thereof). The value of the IP Version number (Ver; 60) is #4, the normal header length of the Internet header (IHL; 61) is #5 and the value of the Type Of Service field (TOS; 62) is #00, these values being given in hexadecimal notation. The protocol field (PROTO; 63) in IP holds an 8-bit number which is defined in "Assigned Numbers", J. Postel, RFC 790, September 1981. This 8-bit number of the protocol field (PROTO; 63) is #06. These four mentioned IP header fields 60–63 are concatenated and padded to get a 32-bit word to be stored in the Protocol Filter 10, in accordance with the present invention. This results in a 32-bit word #00450006 in the present case defining the protocol version, herein referred to as Ver.Prot. field 41, see first level of the tree given in FIG. 4. Source Address (SA; 64) and Destination Address (DA; 65) of said IP header are equal to the addresses at 43 (S.Addr.) and 44 (D.Addr.) of the tree. The format of the addresses being held in these two fields are also defined in "Assigned Numbers", J. Postel, RFC 790, September 1981. The source/destination port (S.D.P.) address 45 in the tree is derived from the Source Port (SP; 66) field and the Destination Port (DP; 67) field of the TCP header in FIG. 6A. Details of TCP are given in the already mentioned protocol specification "Transmission Control Protocol; DARPA Internet Program Protocol Specification", RFC 793, DARPA, September 1981. How these four levels of the TCP/IP part of the tree, shown in FIG. 4, are stored in the Protocol Filter is shown in FIG. 8.

Figure 6B:
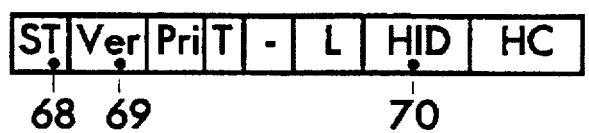
FIG. 6B shows the fields of a ST-II header.

The header of the second protocol, the ST-II protocol, derived from the Internet Protocol, is illustrated in FIG. 6B. The abbreviations are explained in Table 3. Fields 68–70 carry protocol information being relevant.

TABLE 3

| | ST-II header | | |
|---|---|---|---|
| | | Bits | No. |
| ST | IP Version numbdr = 5 | 4 | 68 |
| Ver | ST-Version number = 2 in case of ST-II | 4 | 69 |
| Pri | Priority of the packet | 3 | |
| T | Time Stamp | 1 | |
| L | TotalBytes | 16 | |
| HID | Hop Identifier | 16 | 70 |
| HC | Header Checksum | 16 | |

ST is the IP Version number assigned to ST packets and the Ver field 69 comprises the ST-Version number. The value for ST is #5 and the value for Ver is #2 in case of ST-II, as defined in "Experimental Internet Stream Protocol; Version 2 (ST-II)", RFC 1190, October 1990, edited by C. Topolcic. For ST-II, the content of the ST, Ver, and HID fields 68–70 is extracted from the header and concatenated to the 32-bit word #0052HID, which is stored in the present PF 10.

Figure 7:
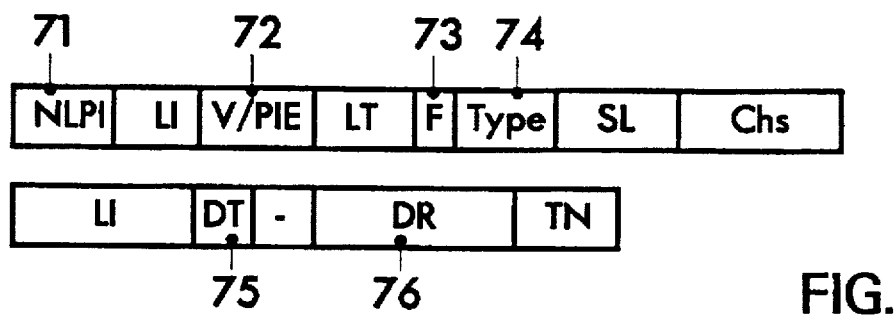
FIG. 7 shows the fields of a TP4 header which builds on a CLNP header.

The respective frames of TP4 which builds on CLNP, as well as the frames corresponding to CLNP are illustrated in FIG. 7. The abbreviations assigned to the respective frames of the CLNP packet header are explained in Table 4.

TABLE 4

| | CLNP header | | |
|---|---|---|---|
| | | Bits | No. |
| NLPI | Network Layer Protocol Indicator | 8 | 71 |
| LI | Length Indicator | 8 | |
| V/PIE | Version/Protocol Id Extension | 8 | 72 |
| LT | Life Time | 8 | |
| F | Flag | 3 | 73 |
| Type | Type: DT PDU | 5 | 74 |
| SL | Segment Length | 16 | |
| Chs | Checksum | 16 | |

Next, some typical values of fields 71–74 of the CLNP header are given. NLPI=#81 indicates that Version 1 of the respective protocol is used. The value of V/PIE is #01. The value 11100 is assigned to the Type frame 74 in case of DT PDU. The following fields of the CLNP header, NLPI=#81, V/PIE=#01, F=X, and Type=Y are concatenated and padded to a 32-bit word #008101XY. This word is herein referred to as CLNP Hdr 51, see FIG. 5. The meaning of the abbreviations used in the TP4 header fields is shown in Table 5.

TABLE 5

TP4 header

|    |                          | Bits | No. |
|----|--------------------------|------|-----|
| LI | Length Indicator         | 16   |     |
| DT | Data                     | 8    | 75  |
| DR | Destinationreference     | 16   | 76  |
| TN | TPDU Number and EOT Flags| 8    |     |

The value of the Data field (DT; 75) of said TP4 header is 1111 0000 which is equal to #F0 using hexadecimal notation. The Destination reference (DR; 76) is XXXX resulting in a 32-bit word #F000XXXX, referred to as TP4 header (TP4 Hdr; 52). The characteristic 32-bit words CLNP Hdr 51 and TP4 Hdr 52 are stored in the present Protocol Filter 10, as described below.

Referring now to FIG. 8, a Content-Addressable Memory (CAM) 80 is shown, which is part of the Protocol Filter 10. This CAM 80 is characterized in that an address of a row which comprises a word is presented at the output 82 each time a protocol information at its input 84, e.g. the word 83, matches the word stored in a row. If for example the word #1000450006 is applied to the CAM's input 84, the CAM provides the CAM address of the respective row at its output 82 as soon as the word at the input 84 matches a stored word. Since the CAM 80 of the present embodiment is a CAM having 256 rows, CAM addresses with $2^8$ bits or two-digit hexadecimal addresses are needed. In the given example the two digit-address #01, corresponding to row 81, would be sent to the output 82. CAMs are described in "Content-Addressable and Associative Memory", L. Chisvim et al., IEEE Computer, July 1989, pp. 51–63.

As shown in FIG. 8, the different paths are stored in the CAM, where a row contains the information of a tree level (Tag), the protocol-type information (PType) and the address information (HId). There are two possibilities in a protocol filter to compare the protocol information with the CAM content. The simplest way is to concatenate the header information to a concatenated information word of width w, the width of a row of this CAM, and compare it in one operation with the rows of a CAM. This approach has the advantage that it is easy to implement. The width of the CAM is determined by the number of bits required when the maximum possible number of header information are concatenated.

The tagged CAM 80, presented in the first embodiment, consumes less memory space than a conventional CAM. The number of header words to be scanned is 1, if for example a protocol such as XTP, directly builds on the Media Access Control (MAC), or at most 5 for the example on the left hand side of FIG. 4. Using the tagged CAM one takes advantage of the hierarchical structure of the protocols and the protocol addresses. In FIG. 8, an exemplary row 83 of the CAM is illustrated. The first section of this row 83 comprises a tag, also referred to as level number, being equal to the respective level of one of the protocol trees of FIGS. 4 and 5. In the next field, to the right of the tag field, the respective protocol-type information (PType) is stored, followed by an address such as for example the 32-bit words Ver. Prot, D.Addr. and so on.

Figure 9:
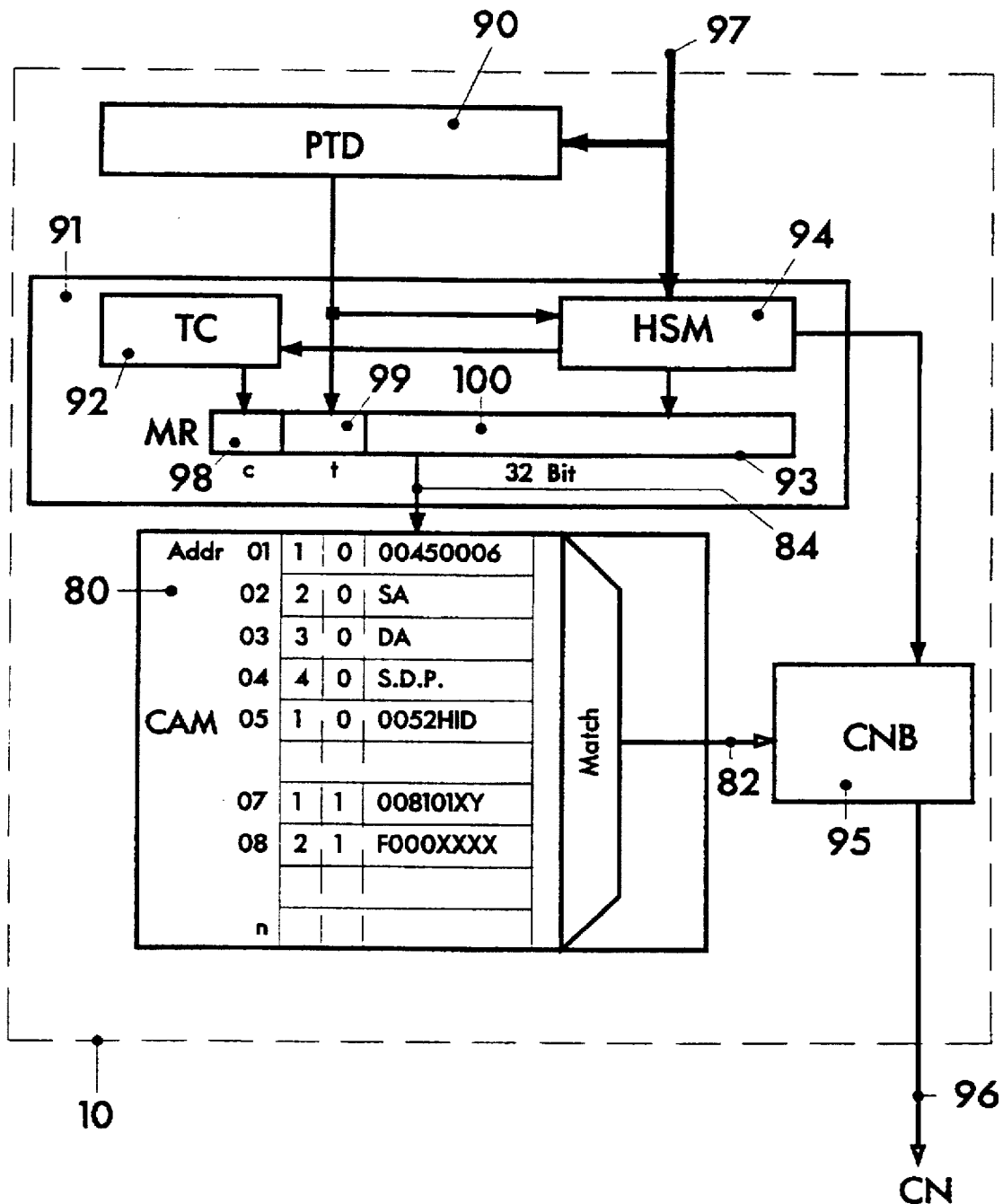
FIG. 9 shows a block diagram of the Protocol Filter in accordance with the first embodiment of the present invention.

The interaction of the various units of the inventive Protocol Filter 10 with said tagged CAM 80 will now be described in connection with FIG. 9. The Protocol Filter 10 comprises the following four units: the already mentioned Content-Addressable Memory (CAM) 80, a Protocol-Type Detector (PTD) 90, a Mask Generator (MG) 91, and a Connection Number Builder (CNB) 95.

The Protocol-Type Detector (PTD) 90 is a state machine which reads the header protocol-type information on a bus 97, e.g. a Token-Ring, and extracts the protocol-type information from an incoming protocol header. Next, the PTD 90 forwards this protocol-type information to the Mask Generator (MG) 91. In case of a LLC header, illustrated in FIG. 3, the PTD 90 extracts the protocol-type information from the Destination Service Access Point (DSAP) field 30 by looking up the DSAP in a table. This table is a memory, not shown, of the size 256 times t, with t being equal to the size of the protocol type field 99 in the Mask Register (MR) 93 of the Mask Generator 91. The DSAP is used as the address to read the protocol-type information in this table.

The Mask Generator (MG) 91 consists of a Header State Machine (HSM) 94 and a Tag Counter (TC) 92. The HSM 94 is started by the PTD protocol-type information and the HSM 94 sequentially reads the header fields provided via bus 97. If a header field is reached which comprises information relevant for the connection detection, i.e. for the processing of a data stream, it is written to the field 100 of the Mask Register (MR) 93. As described above, the tag determines the tree level for which a header word is valid. The Tag Counter (TC) 92 is a c-bit counter which is incremented for each relevant field to be compared and reset by the PTD 90. For TCP/IP and most other transport protocol stacks a 2-bit counter is sufficient. In case of the IP header, see FIG. 6A, the protocol information 60–63 is concatenated in one 32-bit word (#00450006), called concatenated information word, and is compared with the rows of the CAM 80 in one operation. The tag counter and the PTD type are concatenated with the protocol information in the mask register 93. The tag counter is stored in the tag field 98 of the MR 93. The size t of the protocol type field 99 in said MR 93 depends on the number of different protocols which must be processed. With 6 bits most of today's protocols can be covered. With the PF 10 according to the first embodiment, processing of two different protocol types, illustrated in FIGS. 4 and 5, is possible. In this particular example, the length t of the protocol type field 99 is only 1 bit.

The CAM 80, has the same width (w=c+t+32 Bits) as the MR 93. For a match, the CAM address of the data is given out. In cases where the word #100052HID is situated in said MR 93, the content of the MR 93 matches with the content of the row stored under CAM address A=#05 (=0000 0101) and the CAM address A=#05 will be provided at the CAM's output 82. Because the protocol-type information and the tag is included in the mask register 93, the CAM output at port 82 is unique for the specific protocol information, protocol-type information and tree level. The CAM 80 can be written from outside.

Figure 10A:
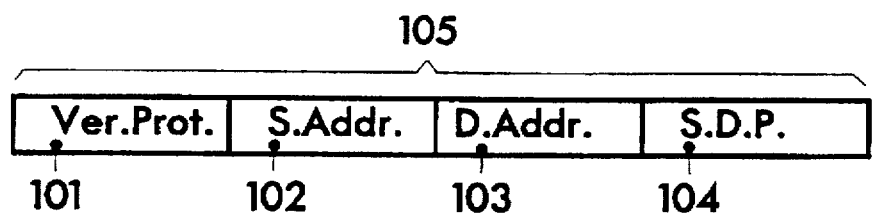
FIG. 10A shows a connection identifier distinguished by means of the present Protocol Filter.
Figure 10B:
FIG. 10B shows a connection identifier distinguished by means of the present Protocol Filter.

The Connection Number Builder (CNB) 95 reads the CAM addresses at the output of CAM 80 and generates a unique connection identifier by concatenating the CAM addresses of the present path through one of the protocol trees. The CNB 95 is triggered by the Mask Generator 91 to read the CAM output 82. If the CAM 80 does not find a match, the CNB 95 is reset and the protocol information is unknown to the present PF 10, and must be dealt with in software. This CNB 95 generates a unique connection identifier, i.e. a unique number, out of the stacked protocol header of LLC/IP/TCP, see short-dashed path in the IP tree of FIG. 4, as set out in context with FIGS. 10A and B. The 8-bit CAM addresses, referred to as Ver.Prot. 101, S.Addr. 102, D.Addr. 103, and S.D.P. 104, are concatenated to form one concatenated information word 105. In case of the LLC/IP/TCP path the value of this word is #01020304 in hexadecimal notation, as illustrated in FIG. 10B. When preceding this word by the protocol-type information, e.g. PType=#00 in the present case, a unique connection identifier #0001020304 is assigned to the present protocol stack.

When concatenating the CAM address of the CAM row in which the value #0052HID, characterizing the ST-II protocol stack, is stored, the connection number #0005 is obtained (A=#05 preceded by PType=#00).

The 32-bit word #008101XY, characterizing the CLNP, header and the 32-bit word assigned to the TP4 header are stored at addresses #07 and #08 of the CAM 80. A unique connection identifier is generated by the CNB 95 when concatenating these two 8-bit wide hexadecimal numbers preceded by a number characterizing the protocol type (PType). This number characterizing the protocol type, referred to as protocol-type information, is #01 in the present case. The value of the connection identifier is #010708.

In case of the TCP/IP protocol stack, the value of the Ver.Prot. field identifies the respective protocol stack. The source addresses (S.Addr.), destination addresses (D.Addr.) and the source/destination ports (S.D.P.) can each identify up to 256 addresses. To use the connection identifier as a pointer in an array of connection control blocks, the 32-bit connection identifier must be converted to a connection index. This can be done in the following, exemplary way: The first byte, given in the Ver.Prot. field 101, is used as a pointer to the array of control blocks of the specific protocol version, in this example the TCP/IP control block. The 8-bit addresses are different, because each address codes an identifier in another tree level. Therefore only $b_i$ bits of the 8 bits are needed to distinguish $2^{b_i}$ addresses in a tree level i. The connection index is generated by extracting the $b_i$ bits in each address and concatenating them. The CAM must be written such that all addresses of the same protocol type and tree level i are different in the least significant bits $b_i$.

Figure 11:
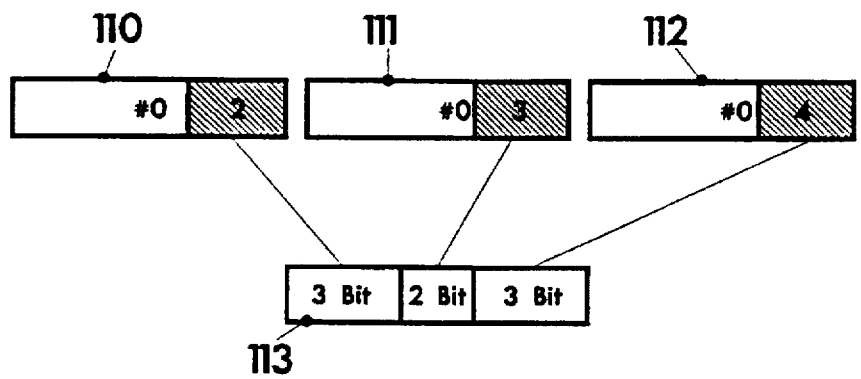
FIG. 11 shows a connection index distinguished by means of the present Protocol Filter.

If, for example, 8 source IP addresses, 4 destination addresses, and 8 source/destination addresses are reserved to generate a connection index, they can be coded in 3, 2, and 3 bits, respectively. The 2- and 3-bit identifiers of the 8 bit wide words 110–112 are concatenated to an 8-bit connection index 113, shown in FIG. 11. In this example, 20 entries in CAM 80 are used for TCP/IP, the remaining 236 are free for other protocols. If the maximal number of address entries at level i is allowed to dynamically increase and $2^{b_i+1}$ addresses of level i must be distinguished, then all addresses used for tree level i must be examined to guarantee that they are different in the least significant $b_{i+1}$ bits. The size of the connection index 113 is increased by one bit. Therefor a table, called routing table, must be built, which holds the pointers to the control blocks, and the connection index is used as a pointer to this table. The generation of a connection index and the management of the CAM is performed by a protocol processor to keep the architecture flexible.

Many protocol connections use less than four tree levels. The ST-II for example uses only the protocol type and stream identifier given in the fields 40 and 42 of the tree in FIG. 4. The resulting connection identifier has 16 significant bits and can be used directly by the Token-Ring adapter 14 to detect multimedia data and to handle these data in dedicated devices.

Prior to describing other embodiments of the present invention, the advantage of a tagged CAM in view of conventional CAMs is addressed. There are three possibilities in a Protocol Filter to compare the necessary protocol information with the CAM content. The simplest way is to concatenate the protocol information, the words comprising protocol-type information and a tag (level number) to a concatenated information word of width w, as described in connection with the first embodiment. This approach makes use of the hierarchical structure of the 'protocol trees'. The second approach, which is easy to implement, is characterized in that all relevant protocol information of a protocol header is concatenated to form one word of the width k. The width k of the CAM is determined by number of bits required when the maximal possible number of header information is concatenated. The number of bits required, for example, for TCP/IP over LLC-Type 1, as illustrated in FIG. 6A, is 128, as shown in Table 6.

TABLE 6

| TCP/IP/LLC | |
|---|---|
| | Bits |
| S.Addr. | 32 |
| D.Addr. | 32 |
| S.D.P. | 32 |
| Version/Type | 8 |
| Protocol | 8 |
| LLC DSAP | 8 |
| LLC SSAP | 8 |
| total bits per row (k) | 128 |

To support 256 connections 256 CAM rows with a total of 32768 bits are required. The header information is extracted in a similar fashion as in the Protocol Type Detector (PTD) and the Mask Generator (MG).

The third approach is to sequentially apply word by word, each carrying address information, read from the protocol header to the input of a CAM. According to this approach it is neither necessary to concatenate header words prior to applying them to the CAM nor to store information in said CAM in reflecting the hierarchical structure of the 'protocol trees'.

The tagged CAM 80, presented in connection with the first embodiment, consumes less memory space than the two other approaches. The number of header fields which have to be scanned is 1 if, for example, XTP directly builds on the MAC (Media Access Control), or at most 5 for the example in FIG. 4. By using the tagged approach one takes advantage of the hierarchical structure of the protocols and the protocol addresses. Because of the integration of the tag information into the Mask Register (MR) 93, up to four levels are compared. The memory space consumed for the 256 TCP/IP connections in the example is 800 bits, i.e. 20 times the CAM width of 40 bits. For 256 XTP connections 256 rows with a total of 10240 bits are consumed.

Figure 12:
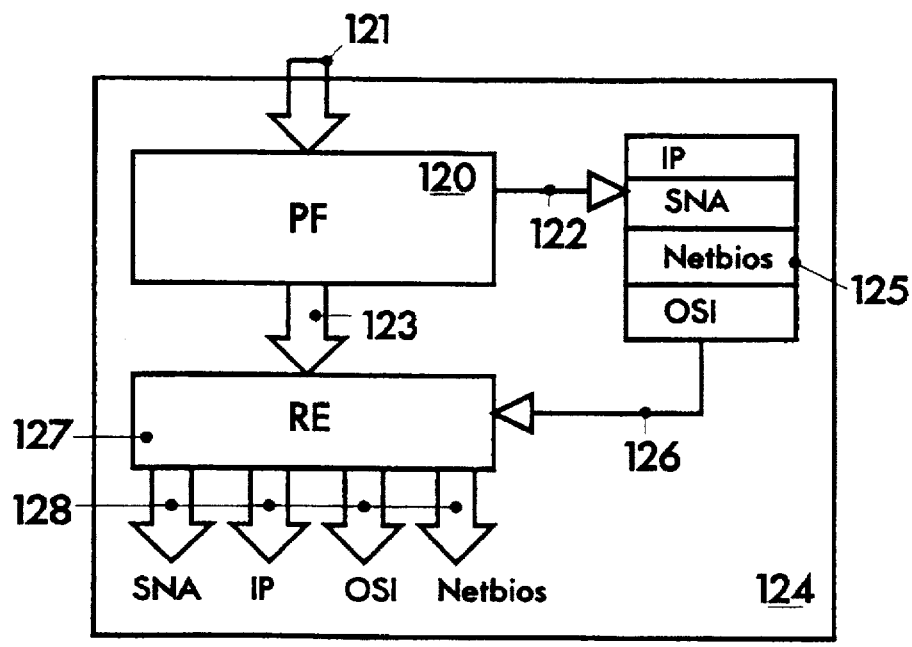
FIG. 12 shows a block diagram of the Protocol Filter as part of a Multiprotocol Router, in accordance with the second embodiment of the present invention.

In connection with the second embodiment of the present invention a Protocol Filter 120, being part of a Multiprotocol Router 124, is described. This Multiprotocol Router 124 comprises a Routing Table (RT) 125 and a Routing Engine (RE) 127, as illustrated in FIG. 12. For simplicity reasons, the second embodiment is restricted to four different protocols; Internet Protocol (IP), System Network Architecture (SNA), Netbios (Local Area Network Basic Input/Output System), and OSI (Open Systems Interconnection). In case that a data stream is received via input 121, said Protocol Filter 120 scans this data stream and extracts the protocol-type information thereof. Next, all relevant protocol header fields are scanned and read. The information of these fields is preceded by said protocol-type information and tagged using a level number generated by a Tag Counter. Then, identical entries in a tagged CAM are looked for, and the respective CAM addresses provided at the CAM's output are concatenated to form a unique connection identifier. Either this unique connection identifier, or a connection index distinguished thereof, is forwarded via link 122 to a Routing Table 125. With aid of the routing information of this table 125, a Routing Engine (RE, 127) starts processing of the data stream whose protocol header has been scanned and processed by the Protocol Filter 120 in the meanwhile.

Figure 13:
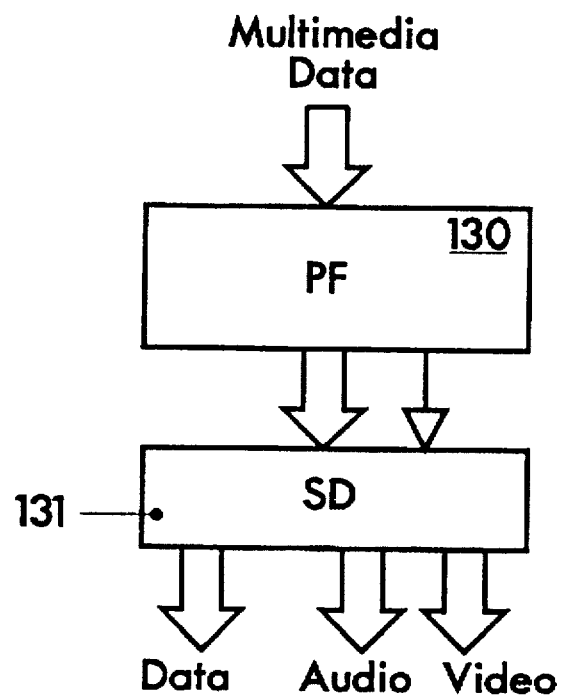
FIG. 13 shows a schematic block diagram of the Protocol Filter as part of a Multimedia Workstation.
Figure 14:
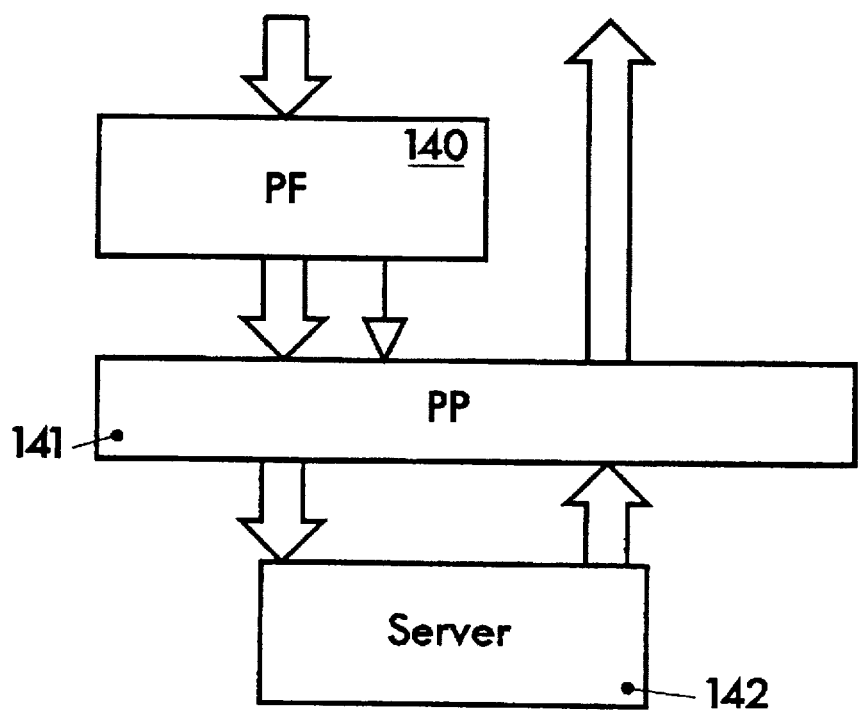
FIG. 14 shows a schematic block diagram of the Protocol Filter as part of a Server.

The use of the present method and apparatus is not limited to the two embodiments described above. Further applications are schematically illustrated in FIGS. 13 and 14. In FIG. 13, the Protocol Filter 130 is shown as part of a multimedia protocol adapter used to separate audio, video and traditional data received. The unique connection identifier is forwarded to a Stream Demultiplexer (SD) 131 for separation of the different data streams. In FIG. 14, a Protocol Filter 140 is shown being connected to a server 142. The data stream received, as well as the unique connection identifier, is forwarded to a Protocol Processor (PP) 141 for further processing.

The Protocol Filter can also be used in a light-weight Multimedia Adapter to separate isochronous and asynchronous data streams and to trigger units for checksumming, decryption and decompression of data. Such a Multimedia Adapter at least comprises a Medium-Access Control (MAC) Unit, a Checksumm Unit, a Direct-Memory Access (DMA) Unit and the Protocol Filter.

In addition to the embodiments and applications mentioned, it is advantageous to employ a Protocol Filter, in accordance with the present invention, in a Protocol Analyzer, also referred to as Protocol Sniffer, which can be plugged to a network, wherever a problem occurs, for monitoring reasons.

Typical environments for the present Protocol Filter are FDDI (Fiber Distributed Data Interface), ATM (Asyncronous Transfer Mode), and FCS (Fiber Channel Standard) networks.

We claim:

1. Apparatus (10) for providing, for the processing of a data stream having a protocol header, a connection identifier being extracted from said header (20) of said data stream, said protocol header (20) comprising fields (22–24,25–27) of a first protocol and a second protocol, which builds on said first protocol, said apparatus comprising:

means for scanning (Protocol Type Detector, 90) said data stream to detect and read protocol-type information of said first protocol in said protocol header (20), means for reading (Mask Generator, 91) protocol information in said fields (22–24, 25–27) of the first and second protocol of said protocol header (20), means for applying said protocol-type information and said protocol information to an input (84) of a content-addressable memory (CAM, 80), means for comparing said protocol-type information and said protocol information, applied to said input (84), with information stored in said CAM (80) and for providing the CAM address containing identical information at an output (82) of said CAM (80), means for generating (Connection Number Builder, 95) said connection identifier by connecting the CAM addresses provided in said output (82) of said CAM (80).

2. The apparatus of claim 1, further comprising means for concatenating (Mask Register, 93) each said protocol information, with said protocol-type information to form one concatenated information word prior to applying said concatenated information word to the CAM's input (84).

3. The apparatus of claim 2, further comprising a counter (Tag Counter, 92) that increments a level number each time a next protocol information is read by said means for reading (Mask Generator, 91), the output of said counter (92) being connected to said means for concatenating (Mask Register, 93) to insert said level number generated at the beginning of said concatenated information word, said counter (92) being reset when all relevant protocol information is read and being started to increment again with each protocol information of a next protocol.

4. The apparatus of claim 1, further comprising means for extracting only the significant bits from the CAM addresses provided at said output (82) of the CAM (80) prior to concatenating only these significant bits of said CAM addresses to form said connection identifier.

5. The apparatus of claim 1, further comprising means for processing said protocol header by software if no information is found in said CAM (80) matching the information applied to the CAM's input (84).

6. The apparatus of claim 1, wherein said connection identifier is used as a pointer to a routing table (125) which provides all information being required for processing said data stream.

7. The apparatus of claim 1, wherein said first protocol is an Internet Protocol (IP), or a ST-II multimedia protocol.

8. The apparatus of claim 1 being part of a multimedia protocol adapter, or of a multiprotocol router (124), concentrator, bridge, or switch, or being part of a protocol analyzer.

9. Method for providing, for the processing of a data stream having a protocol header, a connection identifier, said connection identifier being extracted from said protocol header (20) of said data stream, said protocol header (20) comprising fields (22–24, 25–27) of a first protocol and fields of a second protocol, which builds on said first protocol, said method comprising the following steps:

a) scanning said protocol header (20) to read protocol-type information of said first protocol, b) reading protocol information in said fields (22–24, 25–27) of the first and second protocol of said protocol header (20), c) applying said protocol-type information and said protocol information, read in steps a) and b), to the input (84) of a content-addressable memory (CAM, 80), d) comparing said protocol-type information and said protocol information with information stored in said CAM (80) and for providing the CAM address containing identical information at an output (82) of said CAM (80), and e) generating said connection identifier by concatenating the CAM address provided at said output (82) of said CAM (80).

10. The method of claim 9, wherein said protocol header comprises fields of a third protocol which builds on said second protocol, said method additionally comprising the steps of:

f) reading protocol information of said third protocol, any said protocol information relating to the processing of said data stream, and g) applying said protocol information, read in step f), to said input (84) of the CAM (80), to carry out step d) of claim 9.

11. The method of claim 10, wherein the steps are carried out in an analogous fashion for each further protocol which builds on said third or a higher protocol.

12. The method of claim 9, further comprising the steps of:

h) concatenating each said protocol information, with said protocol-type information to form one concatenated information word, i) applying said concatenated information word to the input (84) of said CAM (80) to carry out step d) of claim 9.

13. The method of claim 12, further comprising the steps of:

j) incrementing a level number each time protocol information is read from said protocol header and k) inserting said level number at the beginning of said concatenated information word of step h), prior to carry out step d) of claim 9.

* * * * *